United States Patent
Jin et al.

(10) Patent No.: US 9,417,887 B2
(45) Date of Patent: Aug. 16, 2016

(54) METHOD AND APPARATUS FOR BOOTSTRAPPING GATEWAY IN DEVICE MANAGEMENT SYSTEM

(71) Applicant: HUAWEI DEVICE CO., LTD., Shenzhen (CN)

(72) Inventors: Zhihao Jin, Beijing (CN); Xinmiao Chang, Beijing (CN); Zhe Zhu, Shenzhen (CN); Haitao Liu, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 268 days.

(21) Appl. No.: 14/041,133

(22) Filed: Sep. 30, 2013

(65) Prior Publication Data
US 2014/0032892 A1    Jan. 30, 2014

Related U.S. Application Data

(63) Continuation of application No. PCT/CN2012/072408, filed on Mar. 16, 2012.

(30) Foreign Application Priority Data

Mar. 30, 2011    (CN) .......................... 2011 1 0078464

(51) Int. Cl.
*G06F 15/177*    (2006.01)
*G06F 9/44*    (2006.01)
(Continued)

(52) U.S. Cl.
CPC ............ *G06F 9/4416* (2013.01); *H04L 41/046* (2013.01); *H04L 41/0806* (2013.01);
(Continued)

(58) Field of Classification Search
CPC ......... G06F 9/4416; G05B 23/02; H04Q 9/00
USPC ................................................. 713/2
See application file for complete search history.

(56) References Cited

U.S. PATENT DOCUMENTS 6,490,617 B1 * 12/2002 Hemphill et al. ............. 709/223
6,507,589 B1    1/2003 Ramasubramani et al.
(Continued)

FOREIGN PATENT DOCUMENTS

CN    1275292    11/2000
CN    101127631    2/2008
(Continued)

OTHER PUBLICATIONS

"Issues with Gateway Bootstrapping of End Devices", Open Mobile Alliance Ltd., Kong Posh Bhat and Jihye Lee, Samsung Electronics, Jul. 28, 2010, pp. 1-9.
(Continued)

*Primary Examiner* — Thomas Lee
*Assistant Examiner* — Volvick Derose
(74) *Attorney, Agent, or Firm* — Staas & Halsey LLP (57) ABSTRACT

The present invention discloses a method and an apparatus for bootstrapping a gateway in a device management system, where the method includes: acquiring, from a terminal device by a gateway, server information saved by the terminal device; determining, by the gateway, a target server according to the acquired server information, and initiating a bootstrap request; and performing, by the gateway, a bootstrap according to bootstrap information received from the target server. The present invention enables the gateway to accomplish a bootstrap process in a use process.

19 Claims, 4 Drawing Sheets

A gateway acquires, from the terminal device, server information stored by a terminal device — 201

The gateway determines a target server according to the acquired server information, and initiates a bootstrap request — 202

The gateway receives bootstrap information sent by the target server, and adopts the bootstrap information to perform a bootstrap process — 203

(51) Int. Cl.
*H04L 12/24* (2006.01)
*H04L 29/08* (2006.01)
*H04W 4/00* (2009.01)

(52) U.S. Cl.
CPC .......... *H04L41/0886* (2013.01); *H04L 67/125* (2013.01); *H04L 67/34* (2013.01); *H04W 4/001* (2013.01); *H04L 41/0206* (2013.01); *H04L 41/0213* (2013.01); *H04L 41/0233* (2013.01)

(56) References Cited

U.S. PATENT DOCUMENTS

| | | | | |
|---|---|---|---|---|
| 8,032,647 | B2* | 10/2011 | Shon et al. | 709/230 |
| 8,667,564 | B1* | 3/2014 | Breau et al. | 726/3 |
| 2004/0081161 | A1* | 4/2004 | Held et al. | 370/395.3 |
| 2004/0199550 | A1* | 10/2004 | Ito | G06F 17/30578 |
| 2005/0034166 | A1* | 2/2005 | Kim | H04N 7/17318 725/119 |
| 2006/0168264 | A1* | 7/2006 | Baba | H04L 12/2809 709/230 |
| 2006/0271659 | A1* | 11/2006 | Mittal et al. | 709/223 |
| 2008/0144590 | A1* | 6/2008 | Rantanen et al. | 370/338 |
| 2008/0209196 | A1* | 8/2008 | Hernandez et al. | 713/2 |
| 2008/0310425 | A1* | 12/2008 | Nath et al. | 370/395.54 |
| 2009/0254641 | A1* | 10/2009 | Liu | G06F 9/4416 709/222 |
| 2009/0292909 | A1* | 11/2009 | Feder et al. | 713/1 |
| 2010/0205420 | A1* | 8/2010 | Chen | G06F 11/2294 713/2 |
| 2011/0004747 | A1* | 1/2011 | Venkatachalam | 713/2 |
| 2011/0047253 | A1* | 2/2011 | Bhat | 709/221 |
| 2011/0055404 | A1* | 3/2011 | Joyce et al. | 709/227 |
| 2011/0188508 | A1* | 8/2011 | Hjelm | G06F 21/33 370/401 |
| 2011/0238806 | A1* | 9/2011 | Bhat | H04L 29/12566 709/223 |
| 2011/0238865 | A1* | 9/2011 | Terashima | H04L 12/2805 709/245 |
| 2012/0036247 | A1 | 2/2012 | Liu et al. | |
| 2012/0191769 | A1* | 7/2012 | Lovinger | H04L 61/1505 709/201 |

FOREIGN PATENT DOCUMENTS

| | | |
|---|---|---|
| CN | 101183968 | 5/2008 |
| CN | 101540996 | 9/2009 |
| CN | 101771556 | 7/2010 |
| EP | 1 473 873 A1 | 11/2004 |
| WO | 2008/154067 A1 | 12/2008 |

OTHER PUBLICATIONS

"End Device Bootstrapping Issues", Open Mobile Alliance Ltd., Kong Posh Bhat and Jihye Lee, Samsung Electronics, Aug. 2, 2010, pp. 1-8.
"Consideration on Bootstrapping device behind gateway", Open Mobile Alliance Ltd., Shingo Fujimoto, Fujitsu, Aug. 27, 2010, pp. 1-9.
"Bootstrapping End Device with Policy", Open Mobile Alliance Ltd., Shingo Fujimoto, Fujitsu, Dec. 6, 2010, pp. 1-6.
"Setup a discussion on Bootstrap Scenarios", Open Mobile Alliance Ltd., Zhe Zhu and Xinmiao Chang, Huawei Technologies, Inc., Jan. 31, 2011, pp. 1-16.
Change Request—"Baseline for the Bootstrap Server Location Alert", Open Mobile Alliance Ltd., Kong Posh Bhat and Jihye Lee, Samsung Electronics, Sep. 28, 2010, pp. 1-2.
Change Request—"Special Push Header for DM Gateway", Open Mobile Alliance Ltd., Kong Posh Bhat and Jihye Lee, Samsung Electronics, Nov. 8, 2010, pp. 1-3.
Change Request—"Gateway Bootstrapping on End Device", Open Mobile Alliance Ltd., Kong Posh Bhat and Jihye Lee, Samsung Electronics, Jan. 6, 2011, pp. 1-5.
"Gateway Management Object Architecture", Draft Version 1.0, Open Mobile Alliance Ltd., Dec. 23, 2010, pp. 1-13.
"GwMO Requirements", Draft Version 1.0, Open Mobile Alliance Ltd., Feb. 16, 2011, pp. 1-15.
"Gateway Management Object Technical Specification", Draft Version 1.0, Open Mobile Alliance Ltd., Mar. 28, 2011, pp. 1-43.
PCT International Search Report and Written Opinion of the International Searching Authority dated Jun. 28, 2012 in corresponding International Patent Application No. PCT/CN2012/072408.
International Search Report, dated Jun. 28, 2012, in corresponding International Application No. PCT/CN2012/072408 (6 pp.).
Chinese Office Action dated Dec. 1, 2014 in corresponding Chinese Patent Application No. 201110078464.0.
Extended European Search Report issued Apr. 14, 2014 in corresponding European Patent Application No. 12763114.1.
Zhe Zhu et al "Additional Bootstrapping" May 3, 2011; XP064070296; pp. 1-4.

\* cited by examiner

METHOD AND APPARATUS FOR BOOTSTRAPPING GATEWAY IN DEVICE MANAGEMENT SYSTEM

CROSS-REFERENCE TO RELATED APPLICATIONS

This application is a continuation of International Application No. PCT/CN2012/072408, filed on Mar. 16, 2012, which claims priority to Chinese Patent Application No. 201110078464.0, filed on Mar. 30, 2011, both of which are hereby incorporated by reference in their entireties.

FIELD OF THE INVENTION

The present invention relates to device management (DM, Device Management) technologies, and in particular, to a method and an apparatus for bootstrapping a gateway in a DM system.

BACKGROUND OF THE INVENTION

Currently, a DM uniform specification is formulated. A DM system provides a low-cost solution for a third party to manage and set terminal devices, for example, to manage and set environment and configuration information in each function object of a mobile terminal, and solve problems encountered in a use process of these terminal devices. Taking an example for illustration, a server performs device management operations, such as installation and upgrading of software and firmware, on a terminal device in a wireless network (OTA, Over the Air) manner, so as to provide a more humanized and personalized service and improve user experience in use of the terminal device. Here, the third party may be a server provided by a carrier, a service provider, or a cooperation partner.

Figure 1:
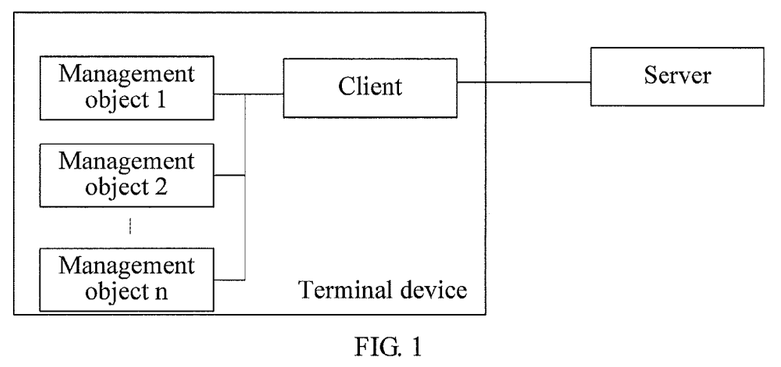
FIG. 1 is a schematic structural diagram of a DM system in the prior art.

FIG. 1 is a schematic structural diagram of a DM system in the prior art. The DM system includes a server and a terminal device, where the server is configured to send a management command to the terminal device through a device management interface; and the terminal device is configured to receive the management command from the server and execute the received management command.

The terminal device provides, on itself, a client and a management object (MO, Management Object). The client parses the received management command and instructs the management object to execute the management command. The management object is stored by adopting a tree structure, where each branch may be considered as an interface for the server to manage the terminal device and is used for forwarding these management commands in the terminal device. These management commands may be acquire commands, substitute commands, execute commands, copy commands or delete commands.

With the development of technologies, a method for a server to perform device management on a terminal device in a local area network through a gateway (GW, Gateway) also exists, where the server and the gateway both conform to the DM specification, the server may manage the gateway through a DM protocol, and the gateway may also manage the terminal device through the DM protocol or other device management protocols. In the gateway, information about a terminal device governed in the local area network may be saved. The server indirectly manages the terminal device by managing the gateway. At this time, the gateway is a terminal device to the server, and the gateway is a server to the terminal device under the gateway. Therefore, the gateway is referred to as a proxy server.

Before the gateway, as a proxy server, performs DM on the terminal device, the server needs to perform a bootstrap process on the gateway, and the gateway needs to perform a bootstrap process on the terminal device, so as to perform subsequent device management.

The bootstrap (BootStrap) process refers to a process of endowing a device with a capability of initiating a management session with a DM server. An unbootstrapped device cannot directly perform a DM session with the server.

For the current DM specification, four manners of performing a bootstrap exist, which are illustrated in the following, respectively.

A first bootstrap manner the bootstrap process has been accomplished before the gateway and the terminal device are delivered from a factory.

A second bootstrap manner: a function card (Smartcard) storing bootstrap information is provided, and after the terminal device physically connects the Smartcard to itself, the terminal device acquires the bootstrap information from the Smartcard and adopts the acquired bootstrap information to accomplish the bootstrap process.

A third bootstrap manner: the server acquires a terminal device identifier, for example, a terminal device number or address, and then sends bootstrap information to a terminal device having the terminal device identifier, and the terminal device adopts the received bootstrap information to accomplish the bootstrap process. The terminal device identifier here is sent to the server when a user using the terminal device actively registers, or is send to the server when the terminal device just accesses a mobile network where the server is located. The server can determine the terminal device according to the terminal device identifier.

A fourth bootstrap manner: the terminal device supports a hypertext transfer (HTTPs, Hypertext Transfer Protocol over Secure Socket Layer) protocol, and the terminal device uses a uniform resource locator (URL, Uniform resource locator) to access the server in an HTTPS protocol acquisition mode, acquires bootstrap information, and adopts the acquired bootstrap information to accomplish the bootstrap process.

In the four bootstrap manners, the first manner is a manner of bootstrapping the gateway before the gateway is delivered from the factory. However, if a terminal device governed by the gateway is under device management of multiple servers, bootstrap settings corresponding to all the servers cannot be set for the gateway before the gateway is delivered from the factory. Therefore, the latter three bootstrap manners need to be adopted. However, in the latter three bootstrap manners, the terminal device accomplishes the bootstrap process by itself after acquiring the bootstrap information, and how the gateway accomplishes a bootstrap is not involved.

Therefore, how the gateway accomplishes the bootstrap process in the device management system is still a problem to be solved urgently.

SUMMARY OF THE INVENTION

Embodiments of the present invention provide a method for bootstrapping a gateway in a device management system, where the method can enable a gateway to accomplish a bootstrap process.

Embodiments of the present invention provide an apparatus for bootstrapping a gateway in a device management system, where the apparatus can enable a gateway to accomplish a bootstrap process.

Technical solutions of the present invention are implemented in this way:

A method for bootstrapping a gateway in a device management system is provided, where the method includes:

acquiring, from a terminal device by a gateway, server information saved by the terminal device;

determining, by the gateway, a target server according to the acquired server information, and initiating a bootstrap request; and performing, by the gateway, a bootstrap according to bootstrap information received from the target server.

An apparatus for bootstrapping a gateway in a device management system is provided, which includes: an acquisition module, a determination module, a bootstrap request module, a receiving module, and a bootstrap module, where the acquisition module is configured to receive server information from a terminal device and send the server information to the determination module;

the determination module is configured to determine a target server according to the acquired server information and notify the bootstrap request module;

the bootstrap request module is configured to initiate a bootstrap request according to the notification of the determination module;

the receiving module is configured to receive bootstrap information sent by the target server; and the bootstrap module is configured to perform a bootstrap according to the received bootstrap information.

An apparatus for bootstrapping a gateway in a device management system is provided, which includes: a save module and a transceiver module, where the save module is configured to save server information; and the transceiver module is configured to send the server information saved by the save module to a gateway.

In the embodiments of the present invention, the gateway acquires the saved server information from the terminal device, determines the target server according to the acquired server information, and after acquiring the bootstrap information from the target server, adopts the acquired bootstrap information to perform the bootstrap. Therefore, in the embodiments of the present invention, the bootstrap process of the gateway is simplified through terminal assistance, and bootstrap approaches of the gateway are enriched, so that the gateway is enabled to accomplish the bootstrap process.

DETAILED DESCRIPTION OF THE EMBODIMENTS

To make the objectives, technical solutions, and advantages of the present invention more comprehensible, the following further describes the present invention in detail with reference to the accompanying drawings and embodiments.

Before a device management process is performed in a situation where a gateway serves as a proxy server, three bootstrap processes are needed in total, which include: a process of bootstrapping a terminal device by a server, a process of bootstrapping the terminal device by the gateway, and a process of bootstrapping the gateway by the server. An embodiment of the present invention provides a process of bootstrapping a gateway by a server.

Specifically, a gateway acquires saved server information from a terminal device, determines a target server according to the acquired server information, and after acquiring bootstrap information corresponding to the target server from the target server, adopts the acquired bootstrap information to perform a bootstrap.

Therefore, in the embodiments of the present invention, the bootstrap process of the gateway is simplified through terminal assistance, and bootstrap approaches of the gateway are enriched, so that the gateway is enabled to accomplish the bootstrap process.

In the embodiment of the present invention, when the gateway initiates a bootstrap request, interaction between the gateway and the target server may be performed directly, or may be performed with assistance of the terminal device.

In the embodiment of the present invention, the performing the bootstrap is: delivering, by the target server, the bootstrap information, and switching the gateway from an initial state to a device management session state according to a result of a bootstrap performed through the information, so as to perform device management on the terminal device.

Figure 2:
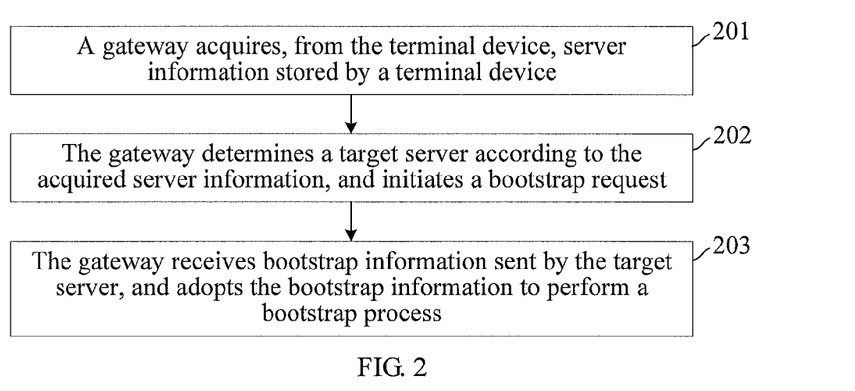
FIG. 2 is a flow chart of a method for bootstrapping a gateway provided by an embodiment of the present invention.

FIG. 2 is a flow chart of a method for bootstrapping a gateway provided by an embodiment of the present invention, which includes the following specific steps:

Step 201: A gateway acquires, from the terminal device, server information stored by a terminal device.

In this step, the stored server information is server information that are bootstrapped on the terminal device.

In this step, the server information acquired from the terminal device is a part of information in a DM account object (DMAcc, DM Account MO) of a server corresponding to the terminal device. In the DMAcc of the corresponding server, a specific setting of the server on the terminal device is saved, for example, a server identifier, and an address, a user name, or a password for the terminal device to access the server. The DMAcc of the corresponding server is sent to the terminal device by the corresponding server before the terminal device is bootstrapped, or is set before the terminal device is delivered from a factory. Each server corresponds to one DMAcc on the terminal device.

In this step, the server information may be a server identifier and corresponding bootstrap address information, or is server identifier information.

Step 202: The gateway determines a target server according to the acquired server information, and initiates a bootstrap request.

In this step, when determining the target server, the gateway also determines, according to server identifier information of the server that has been bootstrapped on the gateway, a target server to which the gateway it to be bootstrapped. That is, the gateway compares the acquired server information with server information stored by the gateway, and determines a server corresponding to server information that is remained in the acquired server information excluding server information stored by the gateway, as the target server.

In this step, after the target server is determined, the gateway may establish a link to the target server according to a target server identifier and corresponding bootstrap address information, and directly initiates the bootstrap request to the determined target server through the link.

In this step, after the target server is determined, the gateway may also initiates the bootstrap request to the determined target server through the terminal device. At this time, the gateway needs to send the determined target server identifier to the terminal device, and may further send gateway information. The gateway information may also be provided for the terminal device by other entities, for example, other terminal devices or other gateways. The gateway information includes a gateway identifier and gateway address information, and the determined target server identifier and the gateway information may be carried in a first notification message and sent. After receiving the determined target server identifier, the terminal device sends the gateway information to a target server having the target server identifier. The gateway information may be carried in a second notification message and sent. After receiving the gateway information, the target server needs to perform a bootstrap process on a gateway having the gateway information.

Step 203: After receiving bootstrap information sent by the target server, the gateway adopts the bootstrap information to perform a bootstrap process.

In this embodiment, if the acquired server information includes the server identifier, the determining the target server according to the acquired server information includes: comparing, by the gateway, the acquired server identifier with a server identifier stored by the gateway, and determining a server corresponding to server information that is remained in the acquired server identifier excluding the server identifier stored by the gateway, as the target server.

If the acquired server information includes the server address information, the determining the target server according to the acquired server information includes: comparing, by the gateway, the acquired server address information with server address information stored by the gateway, and determining a server corresponding to server information that is remained in the acquired server address information excluding the server address information stored by the gateway, as the target server.

Figure 3:
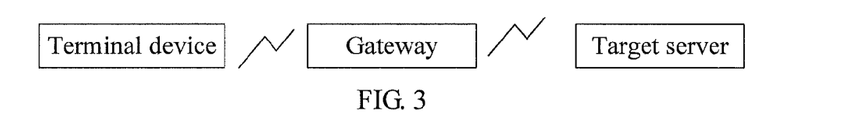
FIG. 3 is a schematic structural diagram of a system for bootstrapping a gateway provided by an embodiment of the present invention.

FIG. 3 is a schematic structural diagram of a system for bootstrapping a gateway provided by an embodiment of the present invention. The system for bootstrapping a gateway includes a terminal device, a target server, and a gateway, where the terminal device is configured to send saved server information to the gateway and send a bootstrap request to a target server according to target server information and/or gateway information sent by the gateway;

the gateway is configured to determine the target server according to the acquired server information, initiate a bootstrap request to the target server or send the target server information and/or the gateway information to the terminal device, receive bootstrap information sent by the target server, and perform a bootstrap; and the target server is configured to accept the bootstrap request initiated by the gateway or the terminal device and send the bootstrap information to the gateway according to the bootstrap request.

In this embodiment, the gateway is further configured to determine the target server according to server information stored by the gateway.

In FIG. 3, zigzag lines represent that wireless connections are adopted between the terminal device, the gateway and the target server. In other embodiments, any two of the terminal device, the gateway, and the target server may be connected in a wired or wireless manner, which is not limited here.

Figure 4:
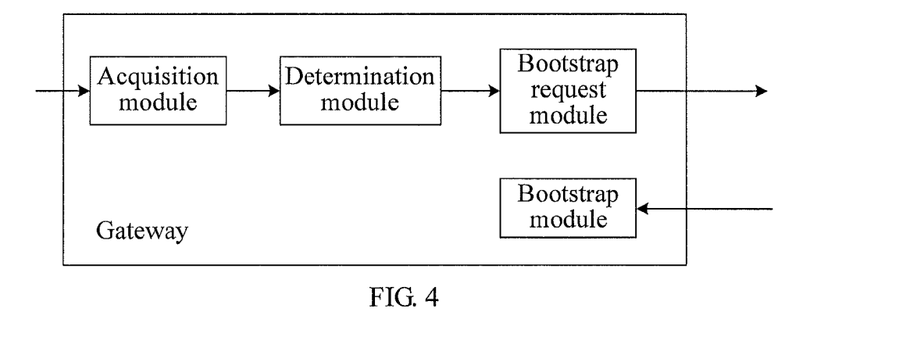
FIG. 4 is a schematic structural diagram of an apparatus 1 for bootstrapping a gateway provided by an embodiment of the present invention.

FIG. 4 is a schematic structural diagram of an apparatus 1 for bootstrapping a gateway provided by an embodiment of the present invention. The apparatus is a gateway, which includes: an acquisition module, a determination module, a bootstrap request module, a receiving module, and a bootstrap module, where the acquisition module is configured to receive server information from a terminal device and send the server information to the determination module;

the determination module is configured to determine a target server according to the acquired server information and notify the bootstrap request module;

the bootstrap request module is configured to initiate a bootstrap request according to the notification of the determination module;

the receiving module is configured to receive bootstrap information sent by the target server; and the bootstrap module is configured to perform a bootstrap according to the received bootstrap information.

In this embodiment, the determination module is also configured to determine the target server according to server information stored by the gateway.

In this embodiment, the bootstrap request module further includes a first bootstrap request module, configured to initiate a connection to an address in bootstrap address information of the target server and request the bootstrap information.

In this embodiment, the bootstrap request module further includes a second bootstrap request module, configured to send target server information to the terminal device.

Figure 5:
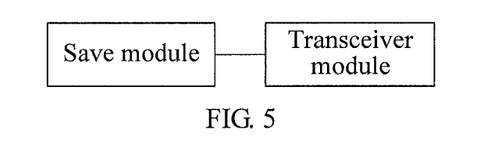
FIG. 5 is a schematic structural diagram of an apparatus 2 for bootstrapping a gateway provided by an embodiment of the present invention.

FIG. 5 is a schematic structural diagram of an apparatus 2 for bootstrapping a gateway provided by an embodiment of the present invention. That is, the apparatus is a terminal device, which includes: a save module and a transceiver module, where the save module is configured to save server information; and the transceiver module is configured to send the server information saved by the save module to a gateway.

In this embodiment, the save module further includes a first save sub-module, configured to save bootstrap address information of the target server.

The transceiver module further includes a first transceiver sub-module, configured to send the bootstrap address information of the target server saved by the first save sub-module to the gateway.

In this embodiment, the transceiver module further includes a second transceiver sub-module, configured to receive target server information sent by the gateway and send a bootstrap request to the target server.

In the above process, the server information saved by the terminal device may be server information of one server, and may also be server information of two or more servers, which is not limited here. The server information saved by the gateway may be one piece of server information, and may also be server information of one server, and may also be server information of two or more servers, which is not limited here. When determining the target server, the gateway may also determine one or two or more target servers, which is performed by adopting the above method.

Two specific embodiments are presented in the following to illustrate the embodiment of the present invention.

Figure 6:
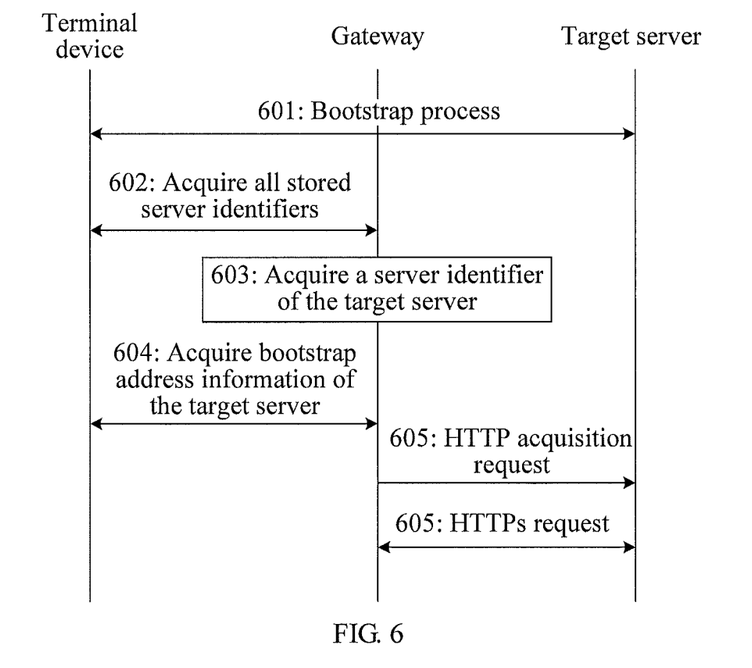
FIG. 6 is a flow chart of a specific Embodiment 1 for bootstrapping a gateway provided by an embodiment of the present invention.

FIG. 6 is a flow chart of a specific Embodiment 1 for bootstrapping a gateway provided by an embodiment of the present invention, which includes the following specific steps:

Step 601: Accomplish a bootstrap process between a terminal device and a target server.

In this step, the terminal device sets a DMAcc for the target server. In the DMAcc, a target server identifier and corresponding bootstrap address information that have been bootstrapped, are saved, for example, the identifier of the target server and a URL of a bootstrap address of the bootstrapped target server.

Figure 8:
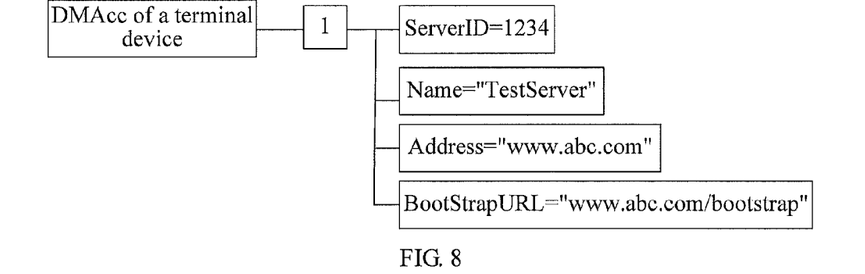
FIG. 8 is a schematic structural diagram of a DMAcc on a terminal device provided by an embodiment of the present invention.

For example, as shown in FIG. 8, in the DMAcc set by the terminal device, an address of a server having an identifier of 1234, in a bootstrap process is saved. A terminal device or a gateway that conforms to a bootstrap condition may perform, through an HTTPs acquire command, an acquisition operation on a server having the identifier, and acquire bootstrap information from the server. In FIG. 8, a name of the server, that is, "testserver", a URL address "www.abc.com", and a URL address for acquiring the bootstrap information, that is, "www.abc.com/bootstrap", are also included.

Step 602: The terminal device and a gateway establish a connection, and the gateway initiates a DM session to the terminal device and acquires all server identifiers of servers that have been bootstrapped.

In this step, the gateway may also initiate information interaction with the terminal device in other forms, for example, information interaction under a dynamic host configuration protocol (DHCP, Dynamic Host Configuration Protocol).

In this step, if the DM session is sent, a process of bootstrapping the terminal device by the gateway needs to be accomplished in step 601, and if information interaction in other forms is performed, the process of bootstrapping the terminal device by the gateway is not needed.

In this step, if the DM session is adopted, the gateway acquires the DMAcc corresponding to the server through an acquire command in the DM session. During the acquisition, the gateway cannot acquire the entire DMAcc because of protection through permissions, but may acquire a part of the DAMcc, which includes, but is not limited to, the server identifier.

Step 603: The gateway compares the identifier of a server bootstrapped on the terminal device (where the identifier is acquired in the preceding step) with a server identifier that has been bootstrapped on the gateway, and determines an identifier of a server that is not bootstrapped on the gateway, that is, the server identifier of the target server.

Figure 9:
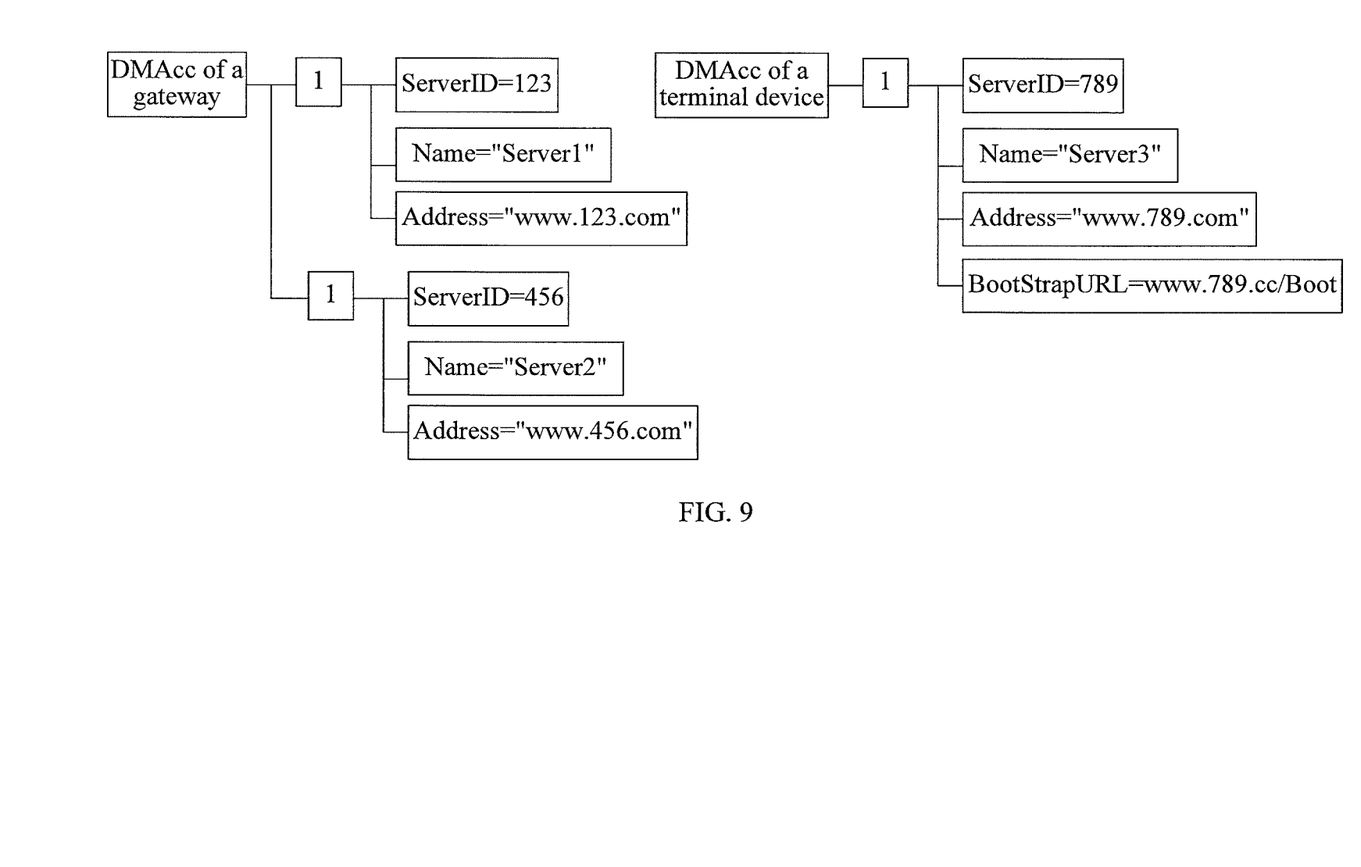
FIG. 9 is a schematic diagram showing structure comparison between a DMAcc on a gateway and a DMAcc on a terminal device provided by an embodiment of the present invention.

In this step, as shown in FIG. 9, for example, a DMAcc of the gateway includes server information with an identifier of 123 and server information with an identifier of 456, but the acquired server information is server information with an identifier of 789. After comparison, the gateway determines that the gateway needs to send a bootstrap request to a server having the identifier of 789, so as to replace the server having the identifier of 789 to perform proxy DM on the terminal device.

Step 604: The gateway acquires, from the terminal device, the bootstrap address information of the target server.

In this step, the gateway sends the identifier of the target server to the terminal device, and the terminal device returns the bootstrap address information of the target server to the gateway.

Step 605: The gateway initiates an HTTPs request to a bootstrap address of the target server; and after the target server receives the request and authenticating that the gateway is valid and may perform DM proxy management on the terminal device, the target server sends bootstrap information of the target server to the gateway; after the gateway receives the bootstrap information, the gateway accomplishes a bootstrap, and performs proxy device management on the terminal device as a proxy server of the target server.

In this step, a process about how the target server authenticates the gateway may be performed by adopting an existing technology and is not described here again.

Figure 7:
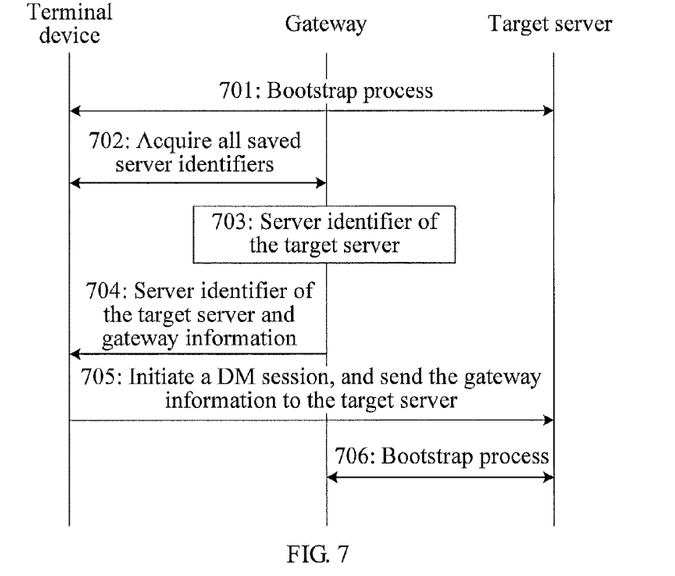
FIG. 7 is a flow chart of a specific Embodiment 2 for bootstrapping a gateway provided by an embodiment of the present invention.

FIG. 7 is a flow chart of a specific Embodiment 2 for bootstrapping a gateway provided by an embodiment of the present invention, which includes the following specific steps:

Step 701: A bootstrap process is accomplished between a terminal device and a target server.

Step 702: The terminal device and a gateway establish a connection, and the gateway sends a DM session to the terminal device and acquires all bootstrapped server identifiers.

In this step, the gateway may also initiate information interaction with the terminal device in other forms, for example, information interaction under a dynamic host configuration protocol (DHCP, Dynamic Host Configuration Protocol).

In this step, if the DM session is sent, a process of bootstrapping the terminal device by the gateway needs to be accomplished in step 701, and if information interaction in other forms is performed, the process of bootstrapping the terminal device by the gateway is not needed.

In this step, if the DM session is adopted, the gateway acquires the DMAcc corresponding to the server through an acquire command in the DM session. During the acquisition, the gateway cannot acquire the entire DMAcc because of protection through permissions, but may acquire a part of the DAMcc, which includes, but is not limited to, the server identifier.

Step 703: The gateway compares the acquired bootstrapped server identifier with a server identifier that has been bootstrapped on the gateway, and determines an unbootstrapped server identifier, that is, the server identifier of the target server.

Step 704: The gateway initiates a DM session to the terminal device, and notifies the terminal device of the server identifier of the target server and gateway information.

In this step, the gateway information may be a public network identifier and/or public network address of the gateway. The adopted DM session is a first notification message that is set. That is, the server identifier of the target server and the gateway information are carried in the first notification message.

For example, the gateway learns and determines, through comparison, that the gateway needs to send a bootstrap request to a server with an identifier of 789, and the first notification message sent to the terminal device is:

<Alert>
  <Data>2345</Data>

```
    <Item>
        <Data>ServerID=789</Data>
<Data>Gateway Address=213.14.12.156 and/or Gw ID=Gw1234</Data>
    </Item>
</Alert>
```

Step 705: After receiving the server identifier of the target server and the gateway information, the terminal device initiates a DM session to the target server and sends the gateway information to the target server.

In this step, for example, after receiving the notification message, the terminal device determines, according to the notification message, that the gateway needs to send a bootstrap request to a target server with the identifier of 789, and the terminal device determines the gateway information at the same time, and the terminal device generates a second notification message, which carries the gateway information, and sends the second notification information to the target server. The second notification message is:

```
    <Alert>
        <Data>2346</Data>
        <Item>
            <Data>Gateway Address=213.14.12.156 and/or Gw
            ID=Gw1234</Data>
        </Item>
    </Alert>
```

Step 706: After receiving the second notification message, the target server determines that a gateway having the gateway information carried by the message initiates a bootstrap request, and when authenticating that the gateway is valid and can perform DM proxy management on the terminal device, the target server sends bootstrap information of the target server to the gateway; after receiving the bootstrap information, the gateway accomplishes a bootstrap process, and performs proxy DM on the terminal device as a proxy server of the target server.

It may be seen that the embodiment of the present invention provides a method in which the gateway detects a difference between server information bootstrapped on the gateway and server information bootstrapped on the terminal device governed by the gateway, so as to determine server information to be bootstrapped and bootstrap a corresponding server on the gateway according to the information (that is, bootstrap the gateway to the corresponding server), so that the gateway may serve as a proxy of the corresponding server and perform DM management on the terminal device. In the bootstrap process of the corresponding server, the bootstrap process may be directly initiated to the corresponding server by the gateway, and may also be initiated by the gateway with assistance of the terminal device.

Therefore, in the method, system, and apparatus provided by the embodiments of the present invention, a process, in which the gateway is bootstrapped to multiple servers respectively when the multiple servers perform DM management on the terminal device, is simplified, that the gateway cannot determine the server to which the gateway is to be bootstrapped is avoided, and the gateway can perform real time selection and the bootstrap process in a use process, thereby reducing the load of the gateway.

The foregoing descriptions are merely exemplary embodiments of the present invention, but are not intended to limit the present invention. Any modification, equivalent replacement, or improvement made within the spirit and principle of the present invention should fall within the protection scope of the present invention.

What is claimed is:

1. A method for bootstrapping a gateway in a device management system, comprising:
   acquiring, from a terminal device by a gateway, server information saved by the terminal device;
   determining, by the gateway, a target server according to the acquired server information, and initiating a bootstrap request, the determining of the target server according to the acquired server information includes:
      comparing, by the gateway, the acquired server information with a server information stored by the gateway, and
      determining, as the target server, a server corresponding to server information among the acquired server information that remains unmatched with the server information stored by the gateway according to the comparing,
   performing, by the gateway, a bootstrap with the target server according to bootstrap information received from the target server based on the determining of the server as the target server using the server information saved through bootstrapping the terminal device to the server.

2. The method according to claim 1, wherein before the acquiring, from the terminal device by the gateway, the server information saved by the terminal device, the method further comprises:
   accomplishing, by the target server, a bootstrap of the terminal device, and accomplishing, by the gateway, a bootstrap of the terminal device.

3. The method according to claim 1, wherein before the initiating of the bootstrap request, the method further comprises:
   acquiring, from the terminal device by the gateway, bootstrap address information of the target server; and
   wherein the initiating of the bootstrap request initiates, by the gateway, a connection to an address in the bootstrap address information of the target server, and requests the bootstrap information.

4. The method according to claim 1, wherein the initiating of the bootstrap request comprises:
   sending, by the gateway, target server information to the terminal device; and
   after the initiating the bootstrap request, the method further comprises:
   sending, by the terminal device, a second bootstrap request to the target server according to the target server information, wherein the second bootstrap request comprises gateway information.

5. The method according to claim 4, wherein when the gateway sends the target server information to the terminal device, the gateway further sends the gateway information to the terminal device.

6. The method according to claim 3, wherein the acquired server information comprises a server identifier; and
   the determining of the target server includes comparing, by the gateway, the acquired server identifier with a server identifier stored by the gateway, and determining the server corresponding to the server information as the target server according to the acquired server identifier.

7. The method according to claim 4, wherein the acquired server information comprises a server identifier; and
   the determining of the target server includes comparing, by the gateway, the acquired server identifier with a server identifier stored by the gateway, and determining the server corresponding to the server information as the target server according to the acquired server identifier.

8. The method according to claim 1, wherein the acquired server information comprises server address information; and
the determining of the target server includes comparing, by the gateway, the acquired server address information with server address information stored by the gateway, and determining the server corresponding to the server information as the target server according to the server address information stored by the gateway.

9. The method according to claim 3, wherein the acquired server information comprises server address information; and
the determining of the target server according to the acquired server information comprises: comparing, by the gateway, the acquired server address information with server address information stored by the gateway, and determining the server corresponding to the server information as the target server according to the acquired server address information.

10. The method according to claim 4, wherein the acquired server information comprises server address information, and the determining of the target server according to the acquired server information comprises:
comparing, by the gateway, the acquired server address information with server address information stored by the gateway, and
determining the server corresponding to the server information as the target server according to the server address information stored by the gateway.

11. An apparatus for bootstrapping a gateway in a device management system, comprising:
an acquisition module configured to receive server information from a terminal device and send the server information to the determination module;
a determination module configured to determine a target server according to the acquired server information;
a bootstrap request module configured to initiate a bootstrap request according to a notification of the received server information from the determination module;
a receiving module configured to receive bootstrap information sent by the target server; and
a bootstrap module configured to perform a bootstrap with the target server according to the received bootstrap information based on determining of the server as the target server using the received server information through bootstrapping the terminal device to the server, and
wherein the target server is determined by comparing the received server information with a server information stored by the gateway, and determining a server corresponding to server information that remains unmatched with the received server information as the target server.

12. The apparatus according to claim 11, wherein the received server information comprises a server identifier and the determination module is further configured to determine the target server according to the server identifier and the server information stored by the gateway.

13. The apparatus according to claim 11, wherein the bootstrap request module comprises a first bootstrap request module, configured to initiate a connection to an address in bootstrap address information of the target server and request the bootstrap information.

14. The apparatus according to claim 12, wherein the bootstrap request module comprises a first bootstrap request module, configured to initiate a connection to an address in bootstrap address information of the target server and request the bootstrap information.

15. The apparatus according to claim 11, wherein the bootstrap request module comprises a second bootstrap request module, configured to send target server information to the terminal device.

16. The apparatus according to claim 12, wherein the bootstrap request module comprises a second bootstrap request module, configured to send target server information to the terminal device.

17. An apparatus for bootstrapping a gateway in a device management system, comprising:
a save module configured to save server information; and
a transceiver module configured to send the server information saved by the save module to a gateway, and
wherein the server information sent from the transceiver is compared with a server information stored by the gateway, and
wherein a server is determined as a target server when the server information sent from the transceiver remains unmatched with the server information stored by the gateway based on determining of the server as the target server using the server information saved by the save module through bootstrapping the apparatus to the server.

18. The apparatus according to claim 17, wherein the save module further comprises a first save sub-module, configured to save bootstrap address information of the target server; and
the transceiver module further comprises a first transceiver sub-module, configured to send the bootstrap address information of the target server saved by the first save sub-module to the gateway.

19. The apparatus according to claim 17, wherein the transceiver module further comprises a second transceiver sub-module, configured to receive target server information sent by the gateway, and send a bootstrap request to the target server.

* * * * *